United States Patent
Bai et al.

(10) Patent No.: US 11,864,209 B2
(45) Date of Patent: Jan. 2, 2024

(54) USER EQUIPMENT ANTENNA PANEL REPORTING AND CONFIGURATION

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 17/321,245

(22) Filed: May 14, 2021

(65) Prior Publication Data

US 2022/0369306 A1    Nov. 17, 2022

(51) Int. Cl.
*H04W 72/51* (2023.01)
*H04W 8/24* (2009.01)
*H04W 72/02* (2009.01)
*H04W 72/1268* (2023.01)
*H04W 72/23* (2023.01)

(52) U.S. Cl.
CPC ............. *H04W 72/51* (2023.01); *H04W 8/24* (2013.01); *H04W 72/02* (2013.01); *H04W 72/1268* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 10,797,810 | B2 * | 10/2020 | Ghanbarinejad | H04B 7/0691 |
| 11,240,831 | B2 * | 2/2022 | Park | H04W 72/1268 |
| 2020/0267712 | A1 * | 8/2020 | Cirik | H04B 7/0695 |
| 2021/0050666 | A1 | 2/2021 | Cirik et al. | |
| 2021/0153215 | A1 * | 5/2021 | Guan | H04B 7/0691 |
| 2021/0167821 | A1 * | 6/2021 | Chen | H04B 7/0408 |
| 2022/0338045 | A1 * | 10/2022 | Nielsen | H04B 7/0404 |

FOREIGN PATENT DOCUMENTS

WO    2020224578 A1    11/2020

OTHER PUBLICATIONS

International Search Report and Written Opinion—PCT/US2022/071680—ISA/EPO—dated Jul. 21, 2022.

* cited by examiner

*Primary Examiner* — Hong S Cho
(74) *Attorney, Agent, or Firm* — Shumaker & Sieffert, P.A.

(57) ABSTRACT

A multi-panel (MP) user equipment (UE) (MP-UE) includes a plurality of physical antennas configurable as one of a plurality of antenna panels. The MP-UE identifies at least one of a capability and a status of each of a plurality of antenna panels of the MP-UE. The MP-UE then reports, to a base station in uplink, the identified at least one of the capability and the status of the plurality of antenna panels in accordance with an antenna panel reporting configuration for the MP-UE.

27 Claims, 15 Drawing Sheets

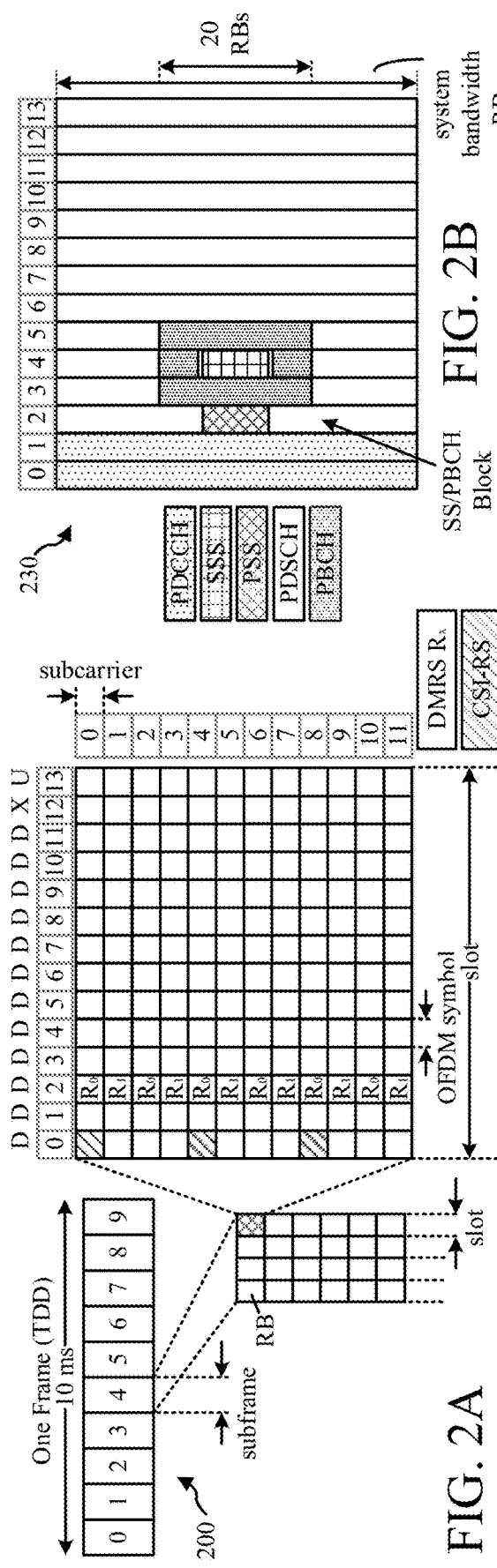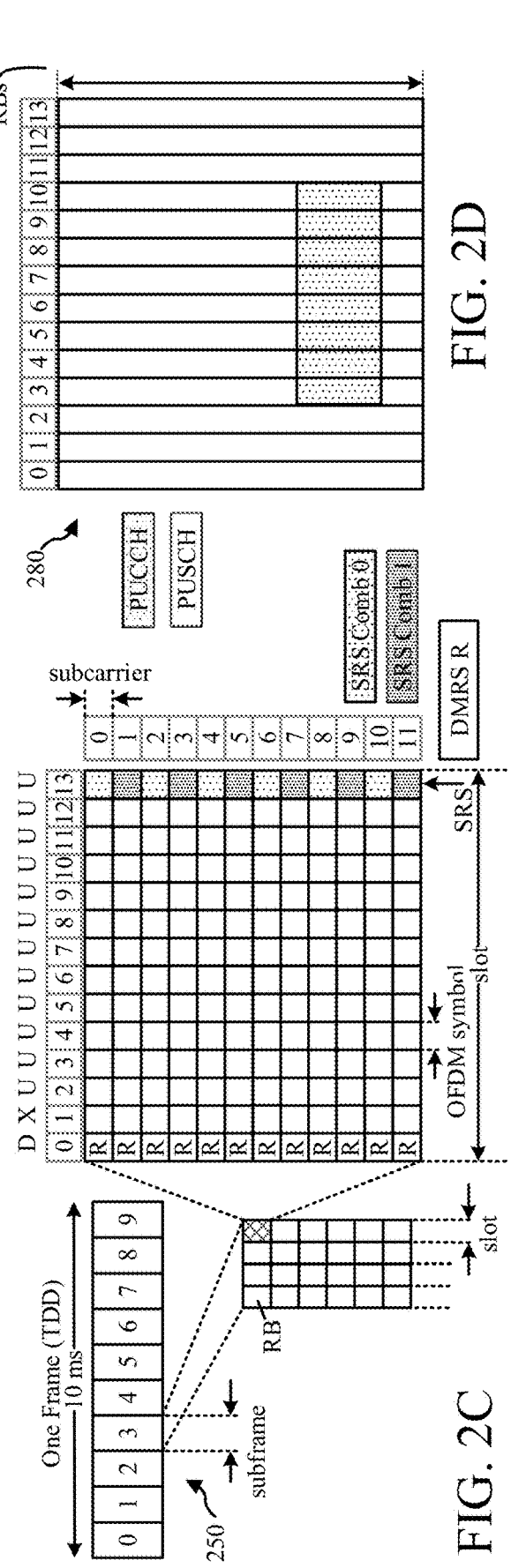

Receive, by a base station from a multi-panel user equipment (MP-UE) an antenna panel report (APR), the APR comprising at least one of a capability and a status of each of a plurality of the antenna panels of the MP-UE in accordance with an MP-UE antenna panel reporting configuration – 1110.

USER EQUIPMENT ANTENNA PANEL REPORTING AND CONFIGURATION

BACKGROUND

Technical Field

The present disclosure relates generally to communication systems, and more particularly in some examples, to configuration of and reporting on user equipment (UE) antenna panels.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The technology disclosed herein includes method, apparatus, and computer-readable media including instructions for wireless communication. In some aspects, a multi-panel (MP) user equipment (UE) (MP-UE) includes a plurality of physical antennas configurable as one of a plurality of antenna panels. The MP-UE identifies at least one of a capability and a status of each of a plurality of antenna panels of the MP-UE. The MP-UE then reports, to a base station in uplink, the identified at least one of the capability and the status of the plurality of antenna panels in accordance with an antenna panel reporting configuration for the MP-UE. In some aspects, each status comprises one of inactive, active, and selected.

In some aspects, the MP-UE receives, from the base station and prior to the reporting, the antenna panel reporting configuration. In such aspects, the reporting includes reporting in accordance with the received antenna panel reporting configuration. In some such aspects, receiving the antenna panel reporting configuration includes receiving the antenna panel reporting configuration as downlink control information (DCI). In some such aspects, the reporting includes reporting via at least one of radio resource control (RRC) protocol and Medium Access Control (MAC) protocol in at least one of physical uplink control channel (PUCCH) and physical uplink shared channel (PUSCH).

In some aspects, the MP-UE identifies, prior to the reporting, a particular antenna panel reporting event of a plurality of antenna panel reporting events. In such aspects, reporting the identified at least one of a capability and a status of the at least one antenna panel is in response to the event identification. In some such aspects, the plurality of antenna panel reporting events includes at least one of: a change in a quantity of antenna panels of the MP-UE; a change in an allowed duty cycle for at least one antenna panel of the MP-UE, an elapsed time period, a change in activation compatibility between antenna panels of the MP-UE; and a change in selection compatibility between antenna panels of the MP-UE.

In some aspects, the reporting includes transmitting, by the MP-UE, a scheduling request for reporting the identified at least one of a capability and a status of each of the plurality of antenna panels in accordance with an antenna panel reporting configuration for the MP-UE. In such aspects, the reporting further includes receiving, by the MP-UE from the base station, an uplink grant for the reporting. In such aspects, the reporting further includes transmitting, by the MP-UE to the base station, the identified at least one of a capability and a status of each of the plurality of antenna panel in accordance with an antenna panel reporting configuration for the MP-UE.

In some aspects, the MP-UE receives, from the base station and in response the reporting, a configuration for the antenna panels of the MP-UE. In such aspects, the MP-UE configures one or more MP-UE antenna panels per the received configuration.

In some aspects a base station receives, from a multi-panel (MP) user equipment (UE) (MP-UE) an antenna panel report. The antenna panel report includes at least one of a capability and a status of each of a plurality of the antenna panels of the MP-UE in accordance with an antenna panel reporting configuration for the MP-UE.

In some aspects, the base station transmits, prior to the receiving, an antenna panel reporting configuration to the MP-UE. In such aspects, receiving includes comprises receiving the antenna panel report in accordance with the transmitted antenna panel reporting configuration.

In some aspects, the base station receives, prior to receiving the antenna panel report, an antenna panel report scheduling request (SR) from the MP-UE. In such aspects, the base station transmits, to the MP-UE in response to receiving the SR and prior to receiving the antenna panel report, an uplink grant for the MP-UE to transmit the antenna panel report. In such aspects, the received antenna panel report is received in the granted uplink resources. In some such aspects, transmitting the uplink grant comprise transmitting the uplink grant in downlink control information (DCI). In some such aspects, receiving the antenna panel report comprises receiving the antenna panel report under at least one of radio resource control (RRC) protocol and Medium Access Control (MAC) protocol in at least one of physical uplink control channel (PUCCH) and physical uplink shared channel (PUSCH).

In some aspects, the base station prepares an MP-UE antenna panel configuration compatible with the received antenna panel report. In such aspects, the base station transmits, to the MP-UE, the determined antenna panel configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 11 is a flowchart of methods of wireless communication in accordance with examples of the technology disclosed herein.

DETAILED DESCRIPTION

Figure 1:
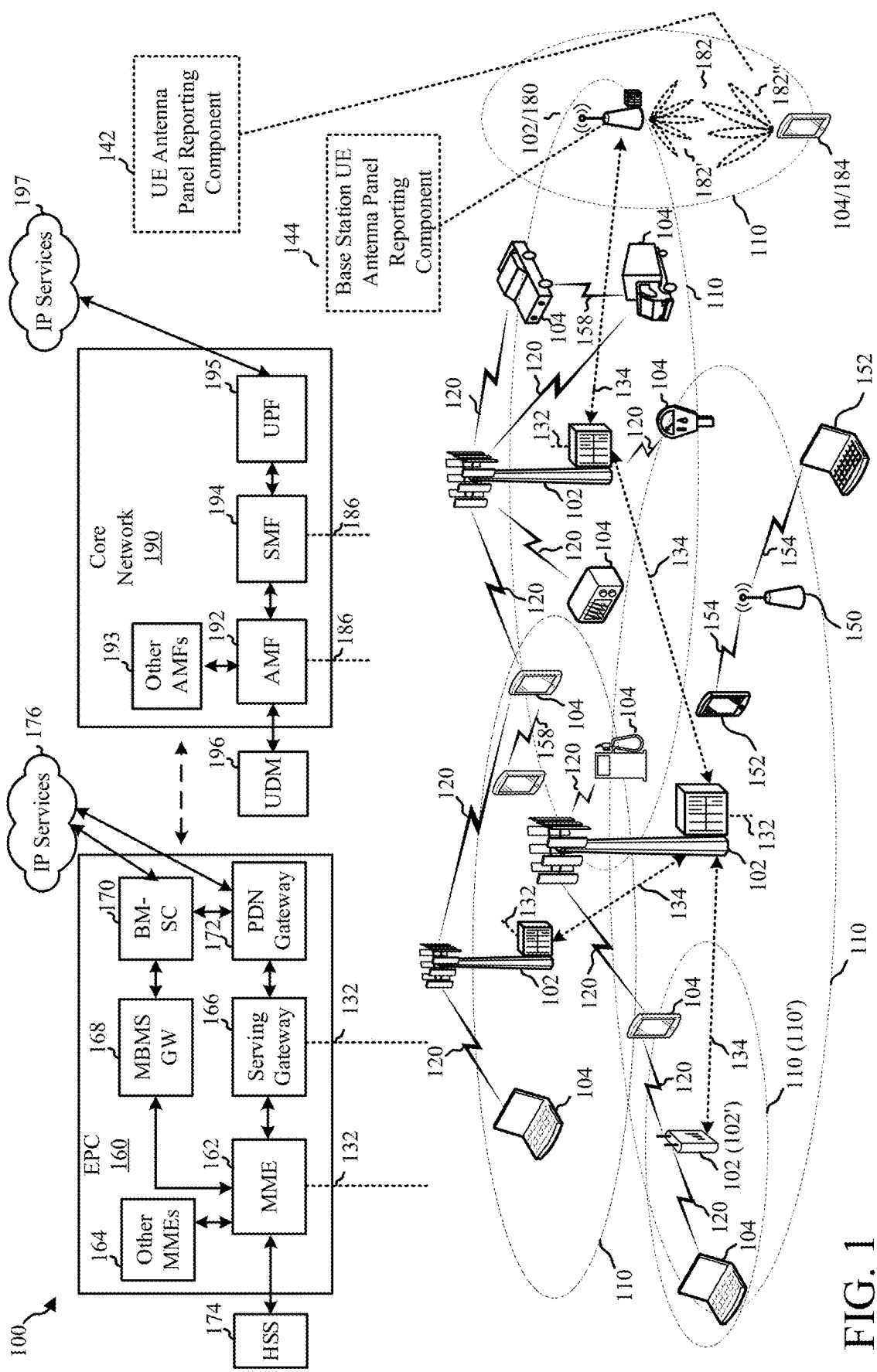
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

A multi-panel (MP) user equipment (UE) (MP-UE) is a UE with a plurality of physical antenna elements that can be grouped into different permutations and configurations to form a variety of antenna "panels." An "antenna panel" is a virtual concept, e.g., the same physical antenna element can be mapped to multiple antenna panels. A beam transmitted from a given antenna panel may be supported by elements under common control, e.g., the same power control process, the same timing advance/control. Typically, only one beam from a given panel can be transmitted in uplink at a time, while beams from different panels not sharing a constituent antenna element can be transmitted at the same time. Beams of the same panel may be associated with the same resource set (RS) ID. Both the UE and the base station (referred to variously herein as a "gNB") may need to indicate the associated panel (whether a UE panel or a gNB panel) when indicating a beam to use/measure or when referring to channel measurement results.

"Activation" with respect to a UE antenna panel means that some number L out of P total antenna panels of the UE are available at least for the purpose of beam measurements, e.g., for reception of downlink (DL) measurement reference signal (RS), for transmission of Sounding Reference Signal (SRS). "Selection" with respect to a UE antenna panel means that one or more of the L activated panels is used for uplink (UL) transmission. However, while conventions allow for a UE to activate/deactivate or select a UE antenna panel, such is not the case for the network (NW) or gNB. There are benefits to allowing the NW/gNB (hereinafter "gNB" for simplicity when discussing UE antenna panel activation/deactivation and selection). For example, a gNB may instruct a UE to activate/deactivate and select certain panels for better diversity (e.g., beam diversity), improved rate, improved signal to noise ratio (SNR). As another example, the gNB may instruct a UE to activate/deactivate and select certain panels because currently active or selected panels are causing interference with other UEs or gNBs—in this case, the interference information is typically only available to the gNBs.

For a gNB to activate an antenna panel in a UE, the gNB needs to know the capabilities and constraints of the antenna panels of the UE—both individually and as a group of antenna panels. For example, the gNB may need to know the maximum number of antenna panels that can remain active or selected at a time, the list of panels that can/cannot be activated or selected together, the maximum number of panels that can be simultaneously scheduled for transmission/reception, the maximum number of layers per panel, and the maximum number of layers across panels. The UE should be able to report its capability and constraints, e.g., during the capability exchange phase when the UE first accesses the network, or when a new panel becomes available.

The reportable aspects of UE antenna panels may change over time. For example, due to power saving considerations, when the UE battery level is low, when the maximum number of activated or selected panels is reached, when a time pattern of panel activation or selection is reached. As another example, the available antenna panels for activation/deactivation and selection may change in certain flexible display/flip devices when the physical configuration of the device changes—e.g., when the UE is flipped open/flipped closed, attached/detached to/from a keyboard or supplemental display. As another example, it may not be advisable to activate or select certain antenna panels compatible with maximum permissible exposure (MPE) levels or interference (aspects that the gNB may not detect on its own).

In aspects of the present disclosure, methods, non-transitory computer readable media, and apparatuses are provided. In some examples of the technology disclosed herein, a multi-panel (MP) user equipment (UE) (MP-UE) includes a plurality of physical antennas configurable as one of a plurality of antenna panels. The MP-UE identifies at least one of a capability and a status of each of a plurality of antenna panels of the MP-UE. The MP-UE then reports, to a base station in uplink, the identified at least one of the capability and the status of the plurality of antenna panels in accordance with an antenna panel reporting configuration for the MP-UE. When UE initially access to a network/or base station, it may report its capability to gNB, e.g., as part of capability exchange in RRC. Later after the initial report, it may report updated capability, e.g. when trigger event happens and/or based on report configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 186 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. In some examples of the technology disclosed herein, both the DL and the UL between the base station and a UE use the same set of multiple beams to transmit/receive physical channels. For example, a given set of beams can carry the multiple copies of a Physical Downlink Shared Channel (PDSCH), described further infra, on the DL and can carry multiple copies of a Physical Uplink Control Channel (PUCCH), also described further infra, on the UL.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range—making mmW transmissions susceptible to blocking and attenuation resulting in, e.g., unsuccessfully decoded data. The mmW base station 180 may utilize beamforming 182 with the UE 104/184 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Continuing to refer to FIG. 1, in certain aspects, A UE 184 includes a plurality of physical antennas configurable as one of a plurality of antenna panels. The UE 184 identifies at least one of a capability and a status of each of a plurality of antenna panels of the UE 184. The UE 184 then reports, to a base station 180 in uplink, the identified at least one of the capability and the status of the plurality of antenna panels in accordance with an antenna panel reporting configuration for the UE 184. Further, a base station 180 receives, from a UE 184, an antenna panel report. The antenna panel report includes at least one of a capability and a status of each of a plurality of the antenna panels of the UE 184 in accordance with an antenna panel reporting configuration for the UE 184.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
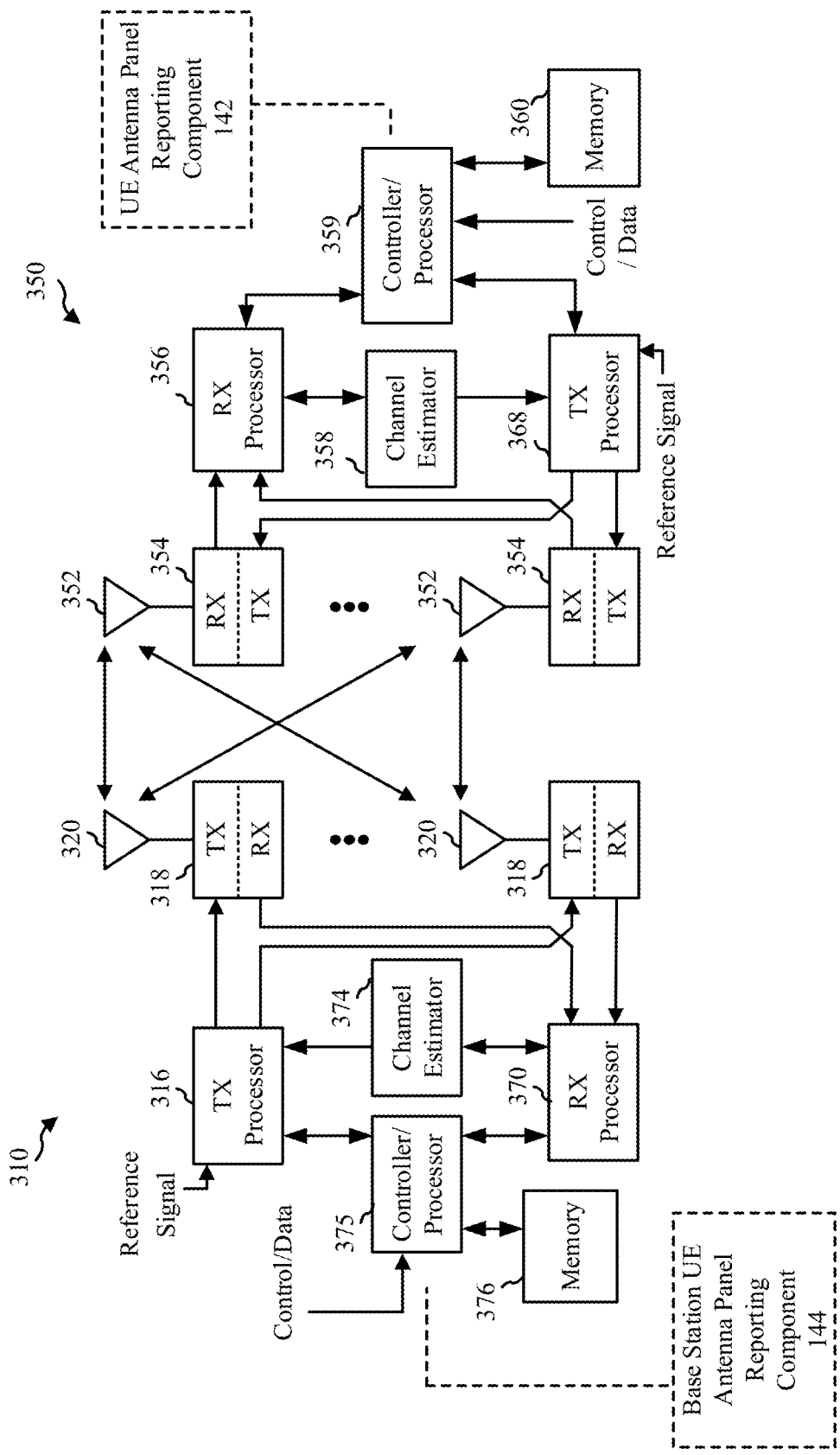
FIG. 3 is a diagram illustrating a base station and user equipment (UE) in an access network, in accordance with examples of the technology disclosed herein.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Continuing to refer to FIG. 3, and continuing to refer to prior figures for context, in certain aspects, in certain aspects, in certain aspects, A UE 350 includes a plurality of physical antennas 352 configurable as one of a plurality of antenna panels. The UE 350 identifies at least one of a capability and a status of each of a plurality of antenna panels of the UE 350. The UE 350 then reports, to a base station 310 in uplink, the identified at least one of the capability and the status of the plurality of antenna panels in accordance with an antenna panel reporting configuration for the UE 350. Further, a base station 310 receives, from a UE 350, an antenna panel report. The antenna panel report includes at least one of a capability and a status of each of a plurality of the antenna panels of the UE 350 in accordance with an antenna panel reporting configuration for the UE 350.

Referring to FIG. 4A and FIG. 4B, and continuing to refer to prior figures for context, a foldable MP-UE 400 is illustrated in both open (FIG. 4A) and folded (FIG. 4B) physical configurations. MP-UE 400 includes portion A 410 (to the left in FIG. 4A) and portion B 420 (to the right in FIG. 4A), and can be folded (clockwise) along fold line 430 to change MP-UE 400 from an open configuration to a folded configuration. MP-UE portion A 410 (shown as transparent) includes portion A top face 412. Portion B 420 (shown as transparent) includes portion B top face 422. Four (4) physical antennas (440a-440d) form antenna array 1 on portion A top face 412; and four (4) physical antennas (450a-450d) form antenna array 2 on portion B top face 422. Once MP-UE 400 is folded, eight (8) additional physical antennas (460a-460h) that form antenna array 3 are exposed.

MP-UE 400 offers many potential antenna panels. Focusing on only a few of the possibilities, Panel #1 includes all eight physical antennas (440a-440d and 450a-450d) of antenna array 1 and antenna array 2, and is available only when MP-UE 400 is open (FIG. 4A), but is not available for activation or selection when some other panels are active or selected (as discussed below). Panel #2 includes the four (4) physical antennas (440a-440d) of antenna array 1, and is available as a separate antenna panel only when antenna panel #1 is not active or selected, but is also available when MP-UE 400 is folded. Panel #3 includes the four (4) physical antennas (450a-450d) of antenna array 2, and is available as a separate antenna panel only when antenna panel #1 is not active or selected, but is also available when the MP-UE 400 is folded. Panel #4 includes the eight physical antennas of antenna array 3, but is available for activation or selection only when the MP-UE 400 is folded. Panel #5 includes all of the MP-UE 400 antennas shown in FIG. 4A and FIG. 4B, but is available for activation and selection only when MP-UE is folded, and only when one or more of Panel #4, Panel #2, and Panel #3 are not active or selected.

While this description of FIG. 4A and FIG. 4B focuses on the physical configuration of the foldable MP-UE 400, other characteristics (of the MP-UE and any base station or network with which the MP-UE is operating) such as electromagnetic characteristics, network characteristics (e.g., capacity, interference), electrical characteristics (e.g., power consumption), and regulatory characteristics will influence the number, type, duration and combination of panels that are available for activation and selection.

Figure 5:
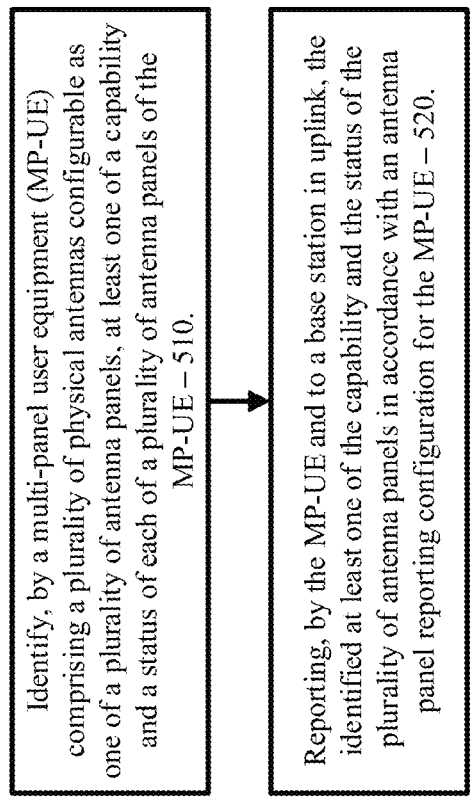
FIG. 5 is a flowchart of methods of wireless communication in accordance with examples of the technology disclosed herein.

Referring to FIG. 5, and continuing to refer to prior figures for context, a flowchart of methods 500 of wireless communication is shown, in accordance with examples of the technology disclosed herein. In such methods 500, a multi-panel (MP) user equipment (UE) (MP-UE) identifies at least one of a capability and a status of each of a plurality of antenna panels of the MP-UE—Block 510. The MP-UE includes a plurality of physical antennas configurable as one of a plurality of antenna panels.

In a continuing example based on the MP-UE 400 of FIG. 4A and FIG. 4B, while in the open configuration, MP-UE 400, identifies five (5) antenna panels, Panel #1-#Panel 5, along with the capabilities of each panel individually (e.g., timing advance, power control, resource set ID, availability of activation and selection on physical open/folded configuration of the MP-UE) and across panels (e.g., compatibility between panels, such as no other panels being available for activation or selection with Panel #5 is activated or selected), in addition to the status of each antenna panel (e.g., Panel #2 and Panel #3 are currently active, Panel #2 is currently selected).

Figure 10:
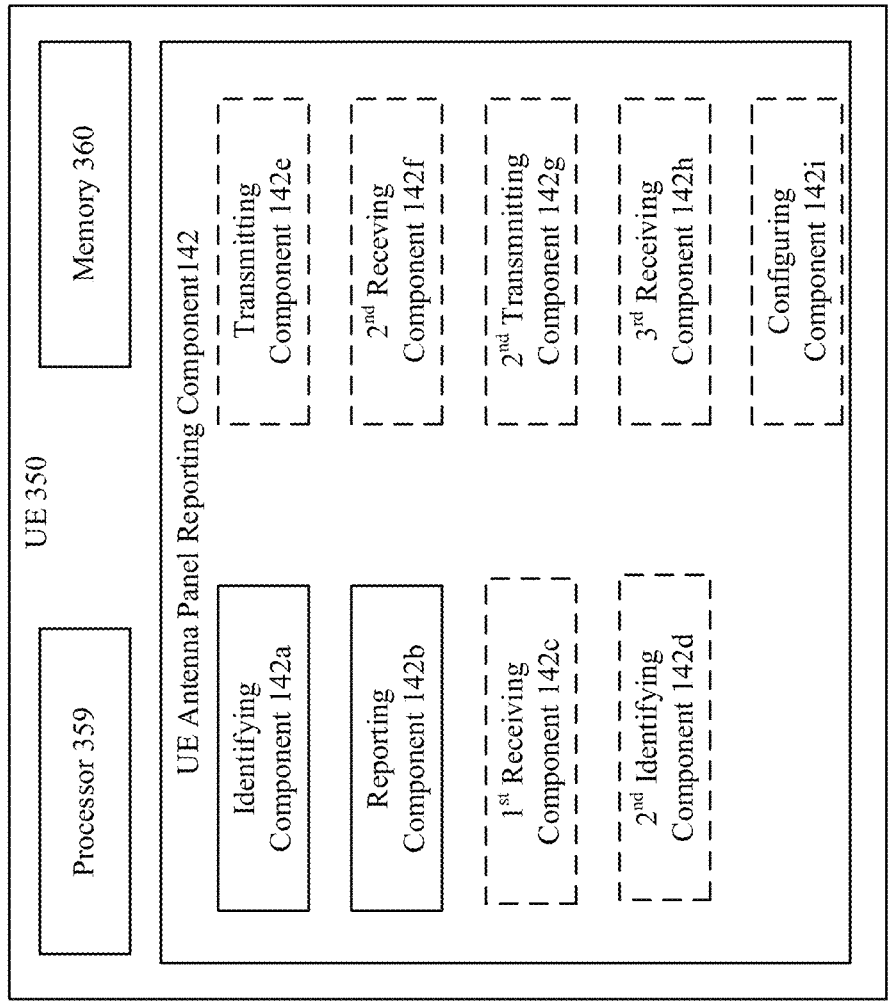
FIG. 10 is a block diagram of a UE, in accordance with examples of the technology disclosed herein.

Referring to FIG. 10, and continuing to refer to prior figures for context, a UE 350 wireless communication device is shown, in accordance with examples of the technology disclosed herein. In addition to processor 359 and memory 360 described above in connection with FIG. 3, UE 350 includes UE antenna panel reporting component 142 as described in conjunction with FIG. 3 above. UE antenna panel reporting component 142 includes identifying component 142a. In some examples, identifying component 142a identifies at least one of a capability and a status of each of a plurality of antenna panels of the MP-UE. Accordingly, identifying component 142a may provide means for identifying at least one of a capability and a status of each of a plurality of antenna panels of the MP-UE.

Referring back to FIG. 5, the MP-UE reports, to a base station in uplink, the identified at least one of the capability and the status of the plurality of antenna panels in accordance with an antenna panel reporting configuration for the MP-UE—Block 520.

In the continuing example, the MP-UE 400 reports the five (5) antenna panels along with the capabilities of each panel individually and across panels (e.g., compatibility between panels, such as no other panels being available for activation or selection with Panel #5 is activated or selected), in addition to the status of each antenna panel (e.g., Panel #2 and Panel #3 are currently active, Panel #2 is currently selected, the remaining panels are inactive, Panel #5 is unavailable in the current physical configuration of the MP-UE 400). The report is contained in a MAC CE message in PUCCH per the default reporting format for the MP-UE. In other examples, reporting is via at least one of radio resource control (RRC) protocol and Medium Access Control (MAC) protocol in at least one of physical uplink control channel (PUCCH) and physical uplink shared channel (PUSCH).

Referring to FIG. 10, and continuing to refer to prior figures for context, UE antenna panel reporting component 142 includes reporting component 142b. In some examples, reporting component 142b reports, to a base station in uplink, the identified at least one of the capability and the status of the plurality of antenna panels in accordance with an antenna panel reporting configuration for the MP-UE. Accordingly, reporting component 142b may provide means for reporting, to a base station in uplink, the identified at least one of the capability and the status of the plurality of antenna panels in accordance with an antenna panel reporting configuration for the MP-UE.

Figure 6:
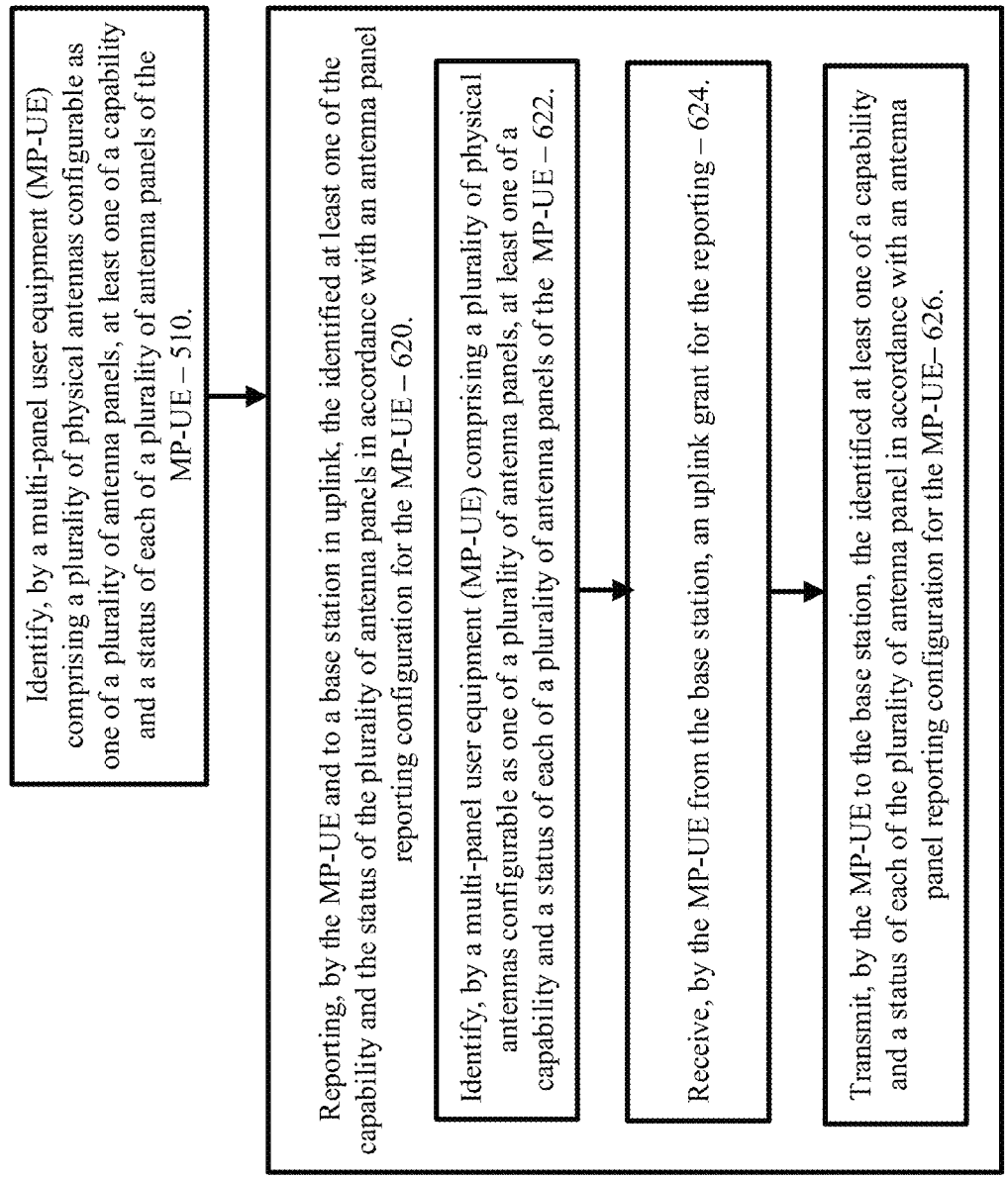
FIG. 6 is a flowchart of methods of wireless communication in accordance with examples of the technology disclosed herein.

Referring to FIG. 6, and continuing to refer to prior figures for context, a flowchart of methods 600 of wireless communication is shown, in accordance with examples of the technology disclosed herein. In such methods 600, Block 510 is performed as described in connection with FIG. 5, and Block 620 corresponds to Block 520 modified by Block 622, Block 624, and Block 626. In such methods the MP-UE transmits a scheduling request (SR) for reporting the identified at least one of a capability and a status of each of the plurality of antenna panels in accordance with an antenna panel reporting configuration for the MP-UE—Block 622. In the continuing example, MP-UE 400 transmits an SR in PUCCH (though the SR can be transmitted in other ways, e.g., in the UCI part on PUSCH). The SR is a physical layer message requesting an uplink grant from the base station.

Referring to FIG. 10, and continuing to refer to prior figures for context, UE antenna panel reporting component 142 includes transmitting component 142e. In some examples, transmitting component 142e transmits a scheduling request (SR) for reporting the identified at least one of a capability and a status of each of the plurality of antenna panels in accordance with an antenna panel reporting configuration for the MP-UE. Accordingly, the transmitting component 142e may provide means for transmitting a scheduling request (SR) for reporting the identified at least one of a capability and a status of each of the plurality of antenna panels in accordance with an antenna panel reporting configuration for the MP-UE.

Referring again to FIG. 6, the MP-UE receive, from the base station, an uplink grant for the reporting—Block 624. In the continuing example, MP-UE 400 receives a DCI Format 0 message in downlink for use in PUCCH.

Referring to FIG. 10, and continuing to refer to prior figures for context, UE antenna panel reporting component 142 includes $2^{nd}$ receiving component 142f. In some examples, $2^{nd}$ receiving component 142f receives, from the base station, an uplink grant for the reporting. Accordingly, the $2^{nd}$ receiving component 142f may provide means for receiving, from the base station, an uplink grant for the reporting.

The MP-UE then transmits, to the base station, the identified at least one of a capability and a status of each of the plurality of antenna panel in accordance with an antenna panel reporting configuration for the MP-UE—the Block 626.

Per the description of Block 520 above, in the continuing example, the MP-UE 400 reports the five (5) antenna panels along with the capabilities of each panel individually and across panels (e.g., compatibility between panels, such as no other panels being available for activation or selection with Panel #5 is activated or selected), in addition to the status of each antenna panel (e.g., Panel #2 and Panel #3 are currently active, Panel #2 is currently selected, the remaining panels are inactive, Panel #5 is unavailable in the current physical configuration of the MP-UE 400). The report is contained in a MAC CE message in PUCCH.

Referring to FIG. 10, and continuing to refer to prior figures for context, UE antenna panel reporting component 142 includes $2^{nd}$ transmitting component 142g. In some examples, $2^{nd}$ transmitting component 142g transmits, to the base station, the identified at least one of a capability and a status of each of the plurality of antenna panel in accordance with an antenna panel reporting configuration for the MP-UE. Accordingly, the $2^{nd}$ transmitting component 142g may provide means for transmitting, to the base station, the identified at least one of a capability and a status of each of the plurality of antenna panel in accordance with an antenna panel reporting configuration for the MP-UE.

Figure 7:
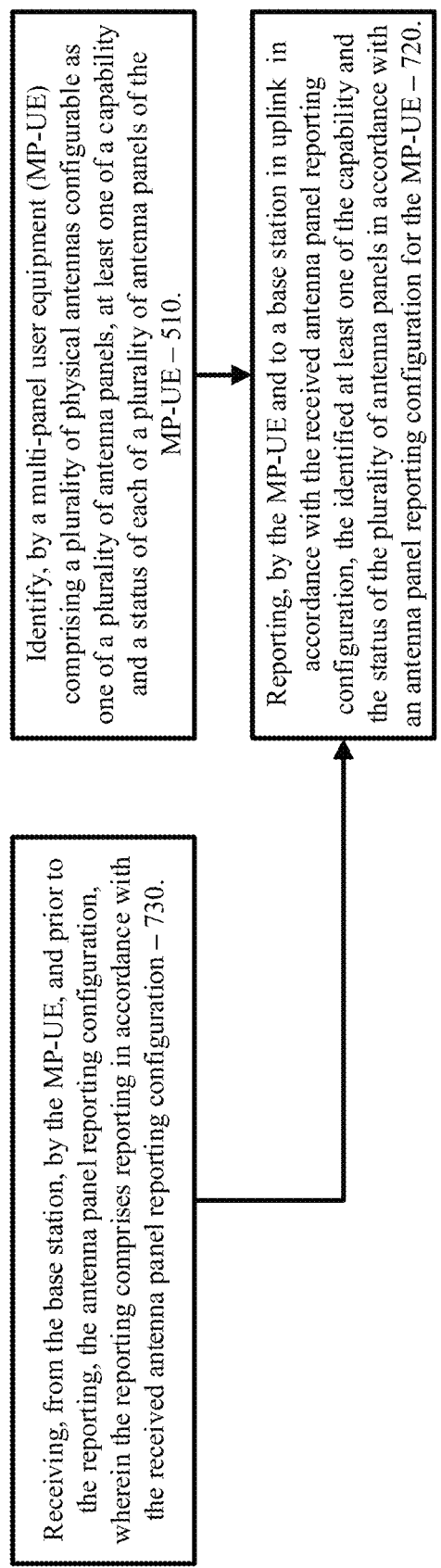
FIG. 7 is a flowchart of methods of wireless communication in accordance with examples of the technology disclosed herein.

Referring to FIG. 7, and continuing to refer to prior figures for context, a flowchart of methods 700 of wireless communication is shown, in accordance with examples of the technology disclosed herein. In such methods 700, Block 510 is performed as described in connection with FIG. 5. In such methods the MP-UE receives, from the base station and prior to the reporting, the antenna panel reporting configuration—Block 730. In the continuing example, MP-UE 400 receives an indication of the reporting configuration to use from among a plurality of formats indexed on the MP-UE 400. Reporting is performed as described above in connection with Block 620 and also in accordance with the received antenna panel reporting configuration—Block 720.

Referring to FIG. 10, and continuing to refer to prior figures for context, UE antenna panel reporting component 142 includes Pt receiving component 142c. In some examples, $1^{st}$ receiving component 142c receives, from the base station and prior to the reporting, the antenna panel reporting configuration. Accordingly, $1^{st}$ receiving component 142c may provide means for receiving, from the base station and prior to the reporting, the antenna panel reporting configuration.

Figure 8:
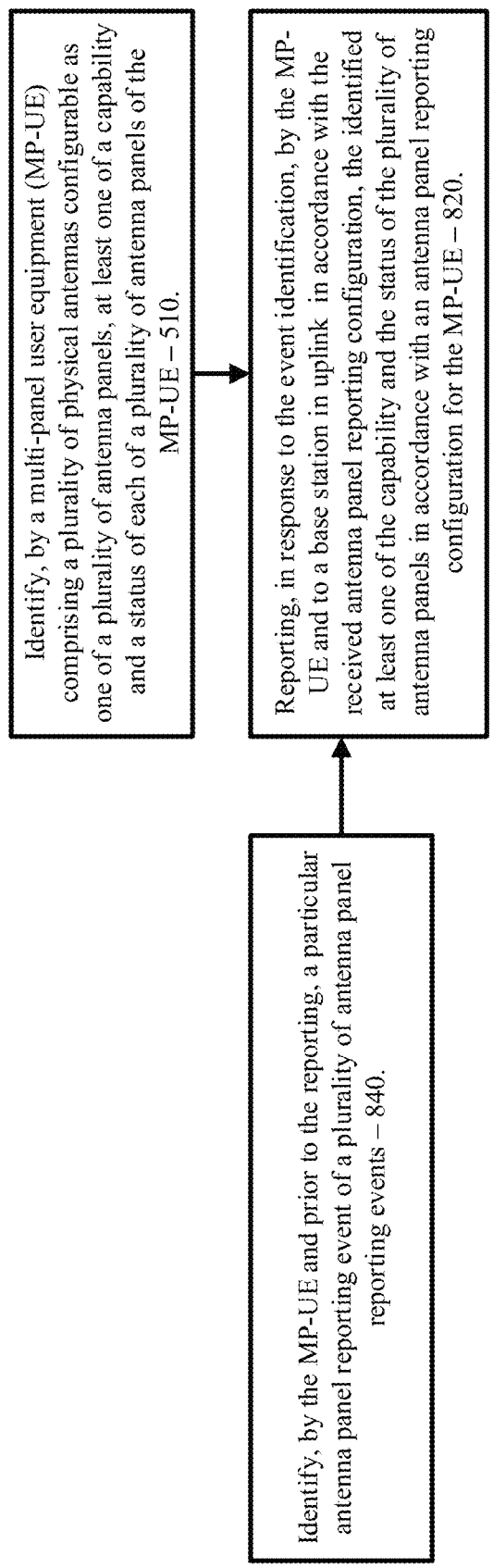
FIG. 8 is a flowchart of methods of wireless communication in accordance with examples of the technology disclosed herein.

Referring to FIG. 8, and continuing to refer to prior figures for context, a flowchart of methods 800 of wireless communication is shown, in accordance with examples of the technology disclosed herein. In such methods 800, Block 510 is performed as described in connection with FIG. 5. In such methods the MP-UE identifies, prior to the reporting, a particular antenna panel reporting event of a plurality of antenna panel reporting events—Block 840. In the continuing example, the MP-UE 400 identifies that a user has folded the MP-UE 400 along fold line 430 to the physical configuration of FIG. 4B, in which additional antenna panels (in comparison to the open physical configuration of the MP-UE shown in FIG. 4A) are available to be activated and selected. While a change in physical configuration is the particular antenna panel reporting event in the continuing example, any other event that effects the availability or operation of an antenna panel can be an antenna panel reporting event, e.g.: a change in a quantity of antenna panels of the MP-UE; a change in an allowed duty cycle for at least one antenna panel of the MP-UE; an elapsed time period; a change in activation compatibility between antenna panels of the MP-UE; and a change in selection compatibility between antenna panels of the MP-UE; joining a network; changing servicing cells; UE handoff between cells; a geographical limit; a regulatory limit; a health limit, such as maximum permissible exposure being reached; a change in battery status or power consumption. When UE initially access to a network/or base station, it may report its capability to gNB, e.g., as part of capability exchange in RRC. Later after the initial report, it may report updated capability, e.g. when trigger event happens and/or based on report configuration.

As a further example an event predicated by reaching a duty cycle limit over a time period where the MP-UE can have two active panels 20% of the time and ≤one active panel 80% of the time. In such a case, the MP-UE will report a maximum number of panels it can support subject to the time pattern/duty circle. This approach differs from reporting a simple time-invariant and unconditioned scalar as the maximum number of active panels.

Referring to FIG. 10, and continuing to refer to prior figures for context, UE antenna panel reporting component 142 includes $2^{nd}$ identifying component 142d. In some examples, $2^{nd}$ identifying component 142d identifies, prior to the reporting, a particular antenna panel reporting event of a plurality of antenna panel reporting events. Accordingly, $2^{nd}$ identifying component 142d may provide means for identifying, prior to the reporting, a particular antenna panel reporting event of a plurality of antenna panel reporting events.

Further, the reporting as described above in connection with Block 529 is in response to the event identification—Block 820.

Figure 9:
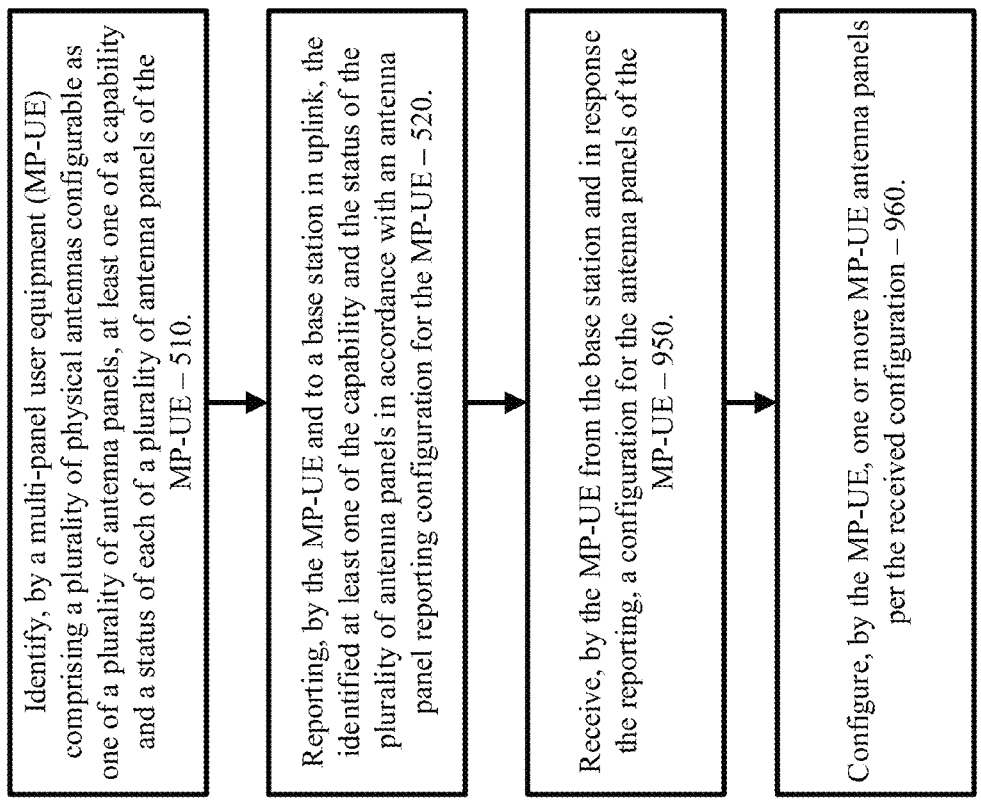
FIG. 9 is a flowchart of methods of wireless communication in accordance with examples of the technology disclosed herein.

Referring to FIG. 9, and continuing to refer to prior figures for context, a flowchart of methods 900 of wireless communication is shown, in accordance with examples of the technology disclosed herein. In such methods 900, Block 510 and Block 520 are performed as described in connection with FIG. 5. In such methods the MP-UE receives, from the base station and in response the reporting, a configuration for the antenna panels of the MP-UE—Block 950. In the continuing example, the MP-UE 400 receives an antenna panel configuration that prohibits the MP-UE 400 from activating Panel #1 and Panel #5, allows the MP-UE 400 to activate Panel #2-Panel #4, places conditions (base station/network approval required) on the selection of Panel #4 (which is newly available), directs the MP-UE 400 to select Panel #2 and Panel #3. The MP-UE 400 also receives, from the base station, an antenna panel reporting configuration to report periodically (e.g., every 100 ms) for the next thirty (30) seconds, while maintaining event-based reporting.

Referring to FIG. 10, and continuing to refer to prior figures for context, UE antenna panel reporting component 142 includes $3^{rd}$ receiving component 142h. In some examples, $3^{rd}$ receiving component 142h receives, from the base station and in response the reporting, a configuration for the antenna panels of the MP-UE. Accordingly, $3^{rd}$ receiving component 142h may provide means for receiving, from the base station and in response the reporting, a configuration for the antenna panels of the MP-UE.

The UE then configures one or more MP-UE antenna panels per the received configuration—Block 960. In the continuing example, the MP-UE 400 configures itself as described in connection with the continuing example of Block 950 for operation and antenna panel reporting.

Referring to FIG. 10, and continuing to refer to prior figures for context, UE antenna panel reporting component 142 includes $3^{rd}$ receiving component 142h. In some examples, $3^{rd}$ receiving component 142h receives, from the base station and in response the reporting, a configuration for the antenna panels of the MP-UE. Accordingly, $3^{rd}$ receiving component 142h may provide means for receiving, from the base station and in response the reporting, a configuration for the antenna panels of the MP-UE.

Referring to FIG. 11, and continuing to refer to prior figures for context, a flowchart of methods 1100 of wireless communication is shown, in accordance with examples of the technology disclosed herein. In such methods a base station receives, from a multi-panel user equipment (MP-UE), an antenna panel report (APR)—Block 1100. The APR includes at least one of a capability and a status of each of a plurality of the antenna panels of the MP-UE in accordance with an MP-UE antenna panel reporting configuration, as described above.

Figure 4:
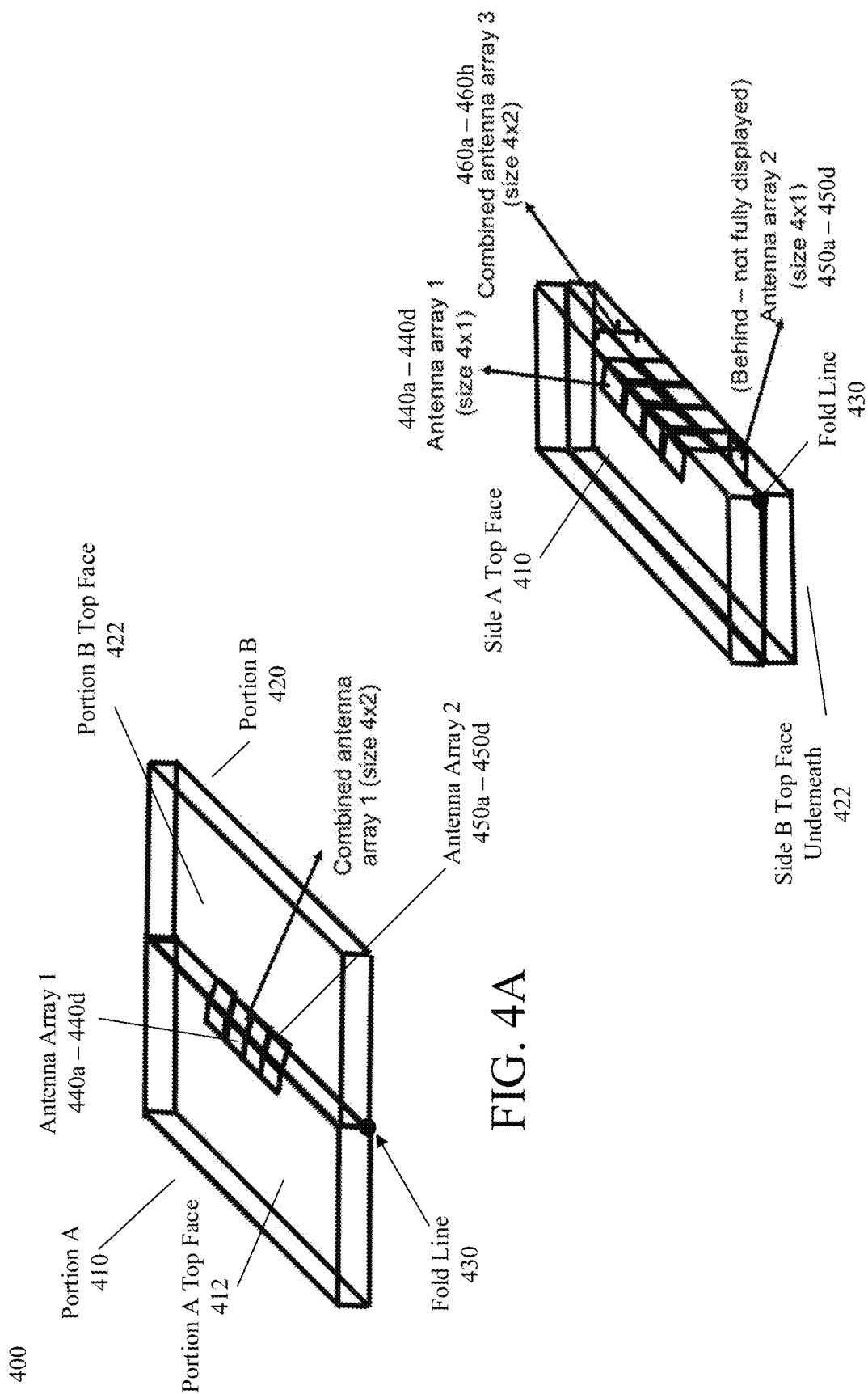
FIG. 4A and FIG. 4B are diagrams illustrating a foldable multi-panel UE 400 in both open (FIG. 4A) and folded (FIG. 4B) physical configurations.

In the continuing example, a base station 310 receives a report from MP-UE 400 regarding the five (5) antenna panels of FIG. 4, along with the capabilities of each panel individually and across panels (e.g., compatibility between panels, such as no other panels being available for activation or selection with Panel #5 is activated or selected), in addition to the status of each antenna panel (e.g., Panel #2 and Panel #3 are currently active, Panel #2 is currently selected, the remaining panels are inactive, Panel #5 is unavailable in the current physical configuration of the MP-UE 400). The report is contained in a MAC CE message in PUCCH per the default reporting format for the MP-UE. In other examples, reporting is via at least one of radio resource control (RRC) protocol and Medium Access Control (MAC) protocol in at least one of physical uplink control channel (PUCCH) and physical uplink shared channel (PUSCH)

Figure 15:
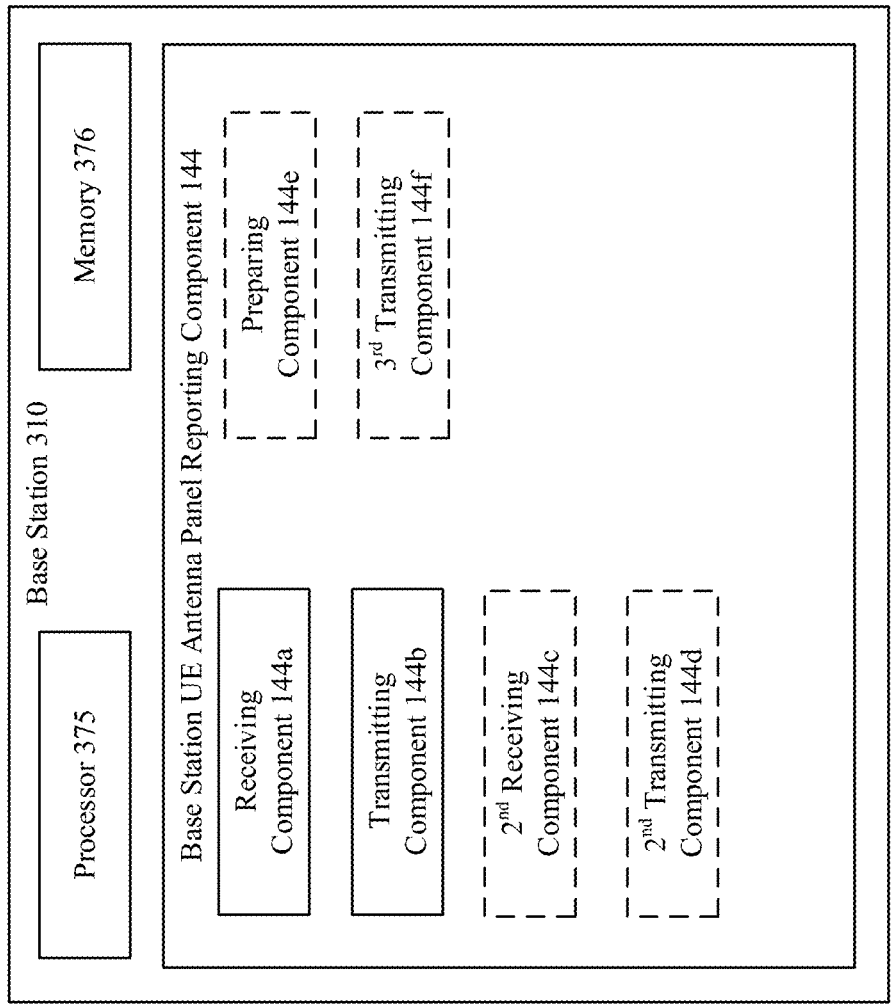
FIG. 15 is a block diagram of a base station, in accordance with examples of the technology disclosed herein.

Referring to FIG. 15, and continuing to refer to prior figures for context, a base station 310 wireless communication device is shown, in accordance with examples of the technology disclosed herein. In addition to processor 375 and memory 376, base station 310 includes base station UE antenna panel reporting component 144 as described in conjunction with FIG. 3 above. Base station UE antenna panel reporting component 144 includes receiving component 144a. In some examples, the receiving component 144a receives, from a multi-panel user equipment (MP-UE), an antenna panel report (APR). Accordingly, the receiving component 144a may provide means for receiving, from a multi-panel user equipment (MP-UE), an antenna panel report (APR).

Figure 12:
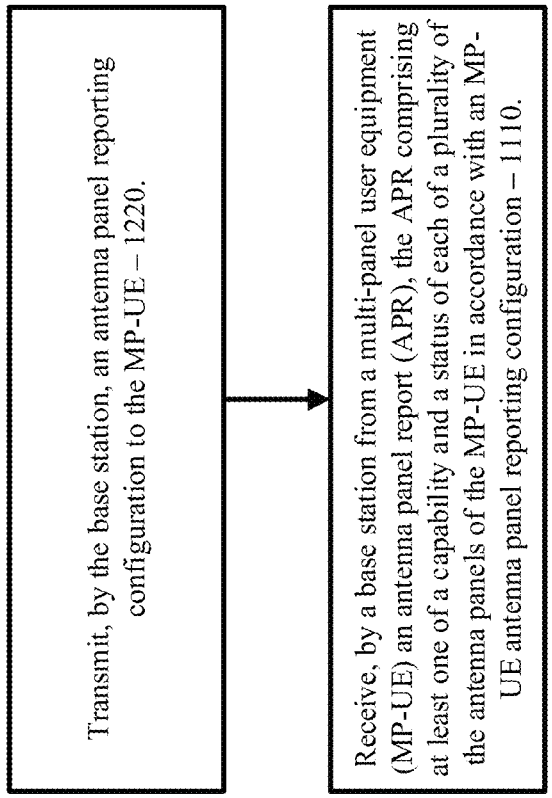
FIG. 12 is a flowchart of methods of wireless communication in accordance with examples of the technology disclosed herein.

Referring to FIG. 12, and continuing to refer to prior figures for context, a flowchart of methods 1200 of wireless communication is shown, in accordance with examples of the technology disclosed herein. In such methods 1200, Block 1110 is performed as described in connection with FIG. 11.

In such methods the base station transmits, prior to the receiving, an antenna panel reporting configuration to the MP-UE—Block 1220. In such methods, the receiving of Block 1110 includes receiving the antenna panel report in accordance with the transmitted antenna panel reporting configuration.

Referring to FIG. 15, and continuing to refer to prior figures for context, the base station UE antenna panel reporting component 144 includes transmitting component 144b. In some examples, the transmitting component 144b transmits, prior to the receiving, an antenna panel reporting configuration to the MP-UE. Accordingly, the transmitting component 144b may provide means for transmitting, prior to the receiving, an antenna panel reporting configuration to the MP-UE.

Figure 13:
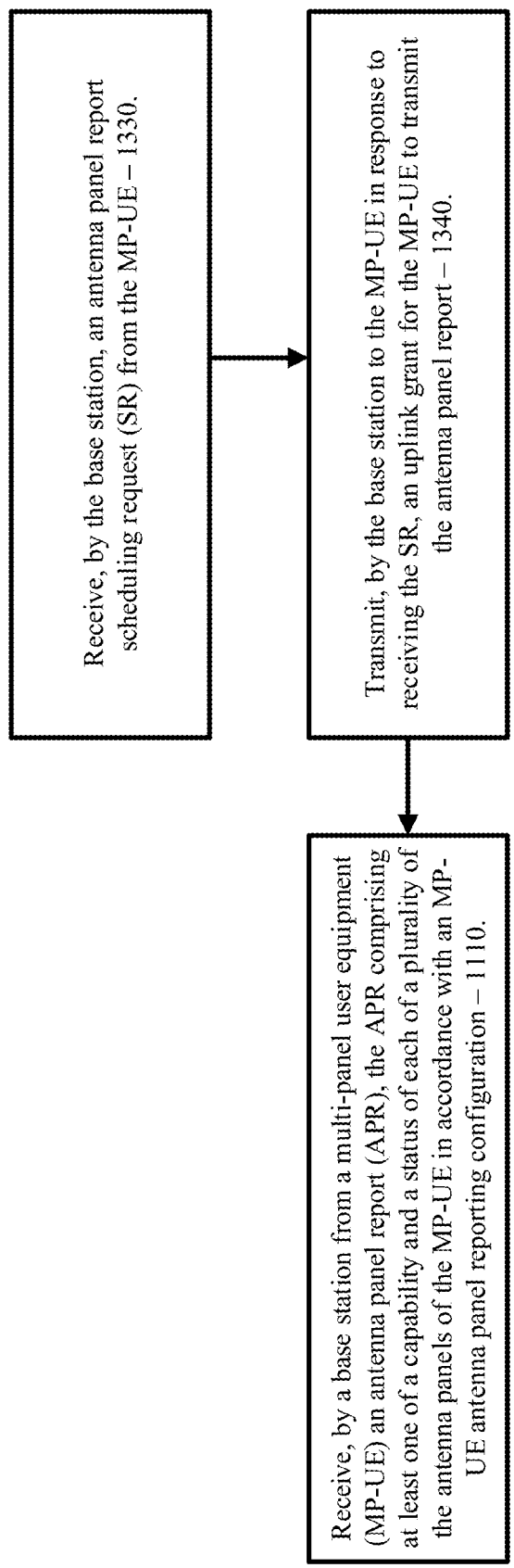
FIG. 13 is a flowchart of methods of wireless communication in accordance with examples of the technology disclosed herein.

Referring to FIG. 13, and continuing to refer to prior figures for context, a flowchart of methods 1300 of wireless communication is shown, in accordance with examples of the technology disclosed herein. In such methods 1300, Block 1110 is performed as described in connection with FIG. 11.

In such methods the base station receives, prior to receiving the antenna panel report, an antenna panel report scheduling request (SR) from the MP-UE—Block 1330. In the continuing example, base station 310 receives, from MP-UE 400, an SR in PUCCH (though the SR can be transmitted in other ways, e.g., in the UCI part on PUSCH). The SR is a physical layer message requesting an uplink grant from the base station.

Referring to FIG. 15, and continuing to refer to prior figures for context, the base station UE antenna panel reporting component 144 includes $2^{nd}$ receiving component 144c. In some examples, the $2^{nd}$ receiving component 144c receives, prior to receiving the antenna panel report, an antenna panel report scheduling request (SR) from the MP-UE. Accordingly, the $2^{nd}$ receiving component 144c may provide means for receiving, prior to receiving the antenna panel report, an antenna panel report scheduling request (SR) from the MP-UE.

The base station then transmits to the MP-UE in response to receiving the SR, an uplink grant for the MP-UE to transmit the antenna panel report—Block 1340. In the continuing example, the base station 310 transmits a DCI Format 0 message in downlink for use in PUCCH.

Referring to FIG. 15, and continuing to refer to prior figures for context, the base station UE antenna panel reporting component 144 includes $2^{nd}$ transmitting component 144d. In some examples, the $2^{nd}$ transmitting component 144d transmits to the MP-UE in response to receiving the SR, an uplink grant for the MP-UE to transmit the antenna panel report. Accordingly, the $2^{nd}$ transmitting component 144d may provide means for transmitting to the MP-UE in response to receiving the SR, an uplink grant for the MP-UE to transmit the antenna panel report.

Figure 14:
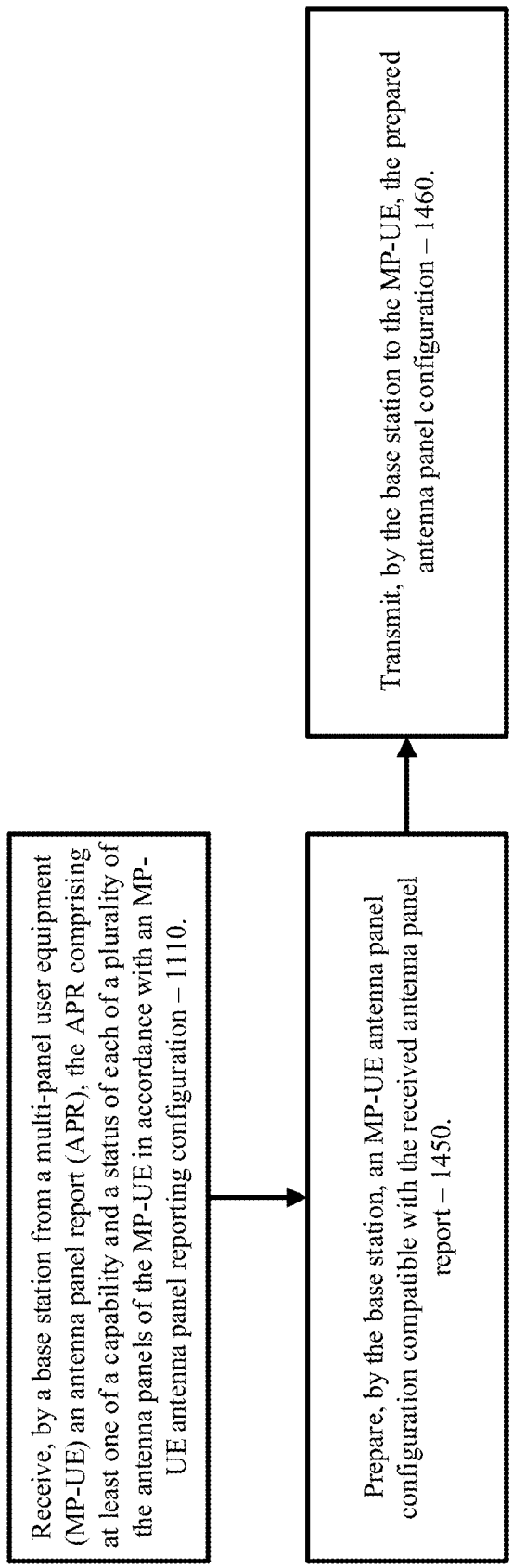
FIG. 14 is a flowchart of methods of wireless communication in accordance with examples of the technology disclosed herein.

Referring to FIG. 14, and continuing to refer to prior figures for context, a flowchart of methods 1400 of wireless communication is shown, in accordance with examples of the technology disclosed herein. In such methods 1400, Block 1110 is performed as described in connection with FIG. 11.

In such methods the base station prepares an MP-UE antenna panel configuration based on the received antenna panel report—Block 1450. In the continuing example, base station 310 prepares an antenna panel configuration that prohibits the MP-UE 400 from activating Panel #1 and Panel #5, allows the MP-UE 400 to activate Panel #2-Panel #4, places conditions (base station/network approval required) on the selection of Panel #4 (which is newly available), directs the MP-UE 400 to select Panel #2 and Panel #3. The base station 310 also prepares an antenna panel reporting configuration to report periodically (e.g., every 100 ms) for the next thirty (30) seconds, while maintaining event-based reporting.

Referring to FIG. 15, and continuing to refer to prior figures for context, the base station UE antenna panel reporting component 144 includes preparing component 144e. In some examples, preparing component 144e prepares an MP-UE antenna panel configuration based on the received antenna panel report. Accordingly, the preparing component 144e may provide means for preparing an MP-UE antenna panel configuration based on the received antenna panel report.

The base station then transmits, to the MP-UE, the prepared antenna panel configuration—Block 1460. In the continuing example the base station 310 transmits, to the MP-UE 400, the prepared antenna panel configuration Referring to FIG. 15, and continuing to refer to prior figures for context, the base station UE antenna panel reporting component 144 includes $3^{rd}$ transmitting component 144f. In some examples, the $3^{rd}$ transmitting component 144f transmits, to the MP-UE, the prepared antenna panel configuration. Accordingly, $3^{rd}$ transmitting component 144f may provide means for transmitting, to the MP-UE, the prepared antenna panel configuration.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects thereof may be combined with aspects of other embodiments or teaching described herein, without limitation.

Example 1 includes methods and apparatuses (including those comprising means for performing the methods) for wireless communication. In Example 1, a multi-panel (MP) user equipment (UE) (MP-UE) includes a plurality of physical antennas configurable as one of a plurality of antenna panels. The MP-UE identifies at least one of a capability and a status of each of a plurality of antenna panels of the MP-UE. The MP-UE then reports, to a base station in uplink, the identified at least one of the capability and the status of the plurality of antenna panels in accordance with an antenna panel reporting configuration for the MP-UE.

In Example 2, Example 1 further includes wherein each status comprises one of inactive, active, and selected. In Example 3, any of Example 1 and Example 2 includes the MP-UE receiving, from the base station and prior to the reporting, the antenna panel reporting configuration. In such examples, the reporting includes reporting in accordance with the received antenna panel reporting configuration. In Example 4, any of Example 1-Example 3 includes wherein receiving the antenna panel reporting configuration includes receiving the antenna panel reporting configuration as downlink control information (DCI). In Example 5, and of Example 1-Example 4 includes wherein reporting includes reporting via at least one of radio resource control (RRC) protocol and Medium Access Control (MAC) protocol in at least one of physical uplink control channel (PUCCH) and physical uplink shared channel (PUSCH). In Example 6, any of Example 1-Example 5 includes identifying, by the MP-UE, prior to the reporting, a particular antenna panel reporting event of a plurality of antenna panel reporting events. In such examples, reporting the identified at least one of a capability and a status of the at least one antenna panel is in response to the event identification. In Example 7, any of Example 1-Example 6 includes wherein the plurality of antenna panel reporting events includes at least one of: a change in a quantity of antenna panels of the MP-UE; a change in an allowed duty cycle for at least one antenna panel of the MP-UE, an elapsed time period, a change in activation compatibility between antenna panels of the MP-UE; and a change in selection compatibility between antenna panels of the MP-UE. In Example 8, any of Example 1-Example 7 includes wherein reporting includes transmitting, by the MP-UE, a scheduling request for reporting the identified at least one of a capability and a status of each of the plurality of antenna panels in accordance with an antenna panel reporting configuration for the MP-UE. In such examples, the reporting further includes receiving, by the MP-UE from the base station, an uplink grant for the reporting. In such examples, the reporting further includes transmitting, by the MP-UE to the base station, the identified at least one of a capability and a status of each of the plurality of antenna panel in accordance with an antenna panel reporting configuration for the MP-UE. In Example 9, any of Example 1-Example 8 includes the MP-UE receiving, from the base station and in response the reporting, a configuration for the antenna panels of the MP-UE. In such examples, the MP-UE configures one or more MP-UE antenna panels per the received configuration.

Example 10 includes methods and apparatuses (including those comprising means for performing the methods) for wireless communication. In Example 10, a base station receives, from a multi-panel (MP) user equipment (UE) (MP-UE) an antenna panel report. The antenna panel report includes at least one of a capability and a status of each of a plurality of the antenna panels of the MP-UE in accordance with an antenna panel reporting configuration for the MP-UE.

In Example 11, Example 10 includes wherein the base station transmits, prior to the receiving, an antenna panel reporting configuration to the MP-UE. In such examples, receiving includes comprises receiving the antenna panel report in accordance with the transmitted antenna panel reporting configuration. In Example 12, any of Example 10 and Example 11 includes the base station receiving, prior to receiving the antenna panel report, an antenna panel report scheduling request (SR) from the MP-UE. In such examples, the base station transmits, to the MP-UE in response to receiving the SR and prior to receiving the antenna panel report, an uplink grant for the MP-UE to transmit the antenna panel report. In such examples, the received antenna panel report is received in the granted uplink resources. In Example 13, any of Example 10-Example 12 includes wherein transmitting the uplink grant includes transmitting the uplink grant in downlink control information (DCI). In Example 14, any of Example 10-Example 13 includes wherein receiving the antenna panel report comprises receiving the antenna panel report under at least one of radio resource control (RRC) protocol and Medium Access Control (MAC) protocol in at least one of physical uplink control channel (PUCCH) and physical uplink shared channel (PUSCH). In Example 15, any of Example 10-Example 14 includes the base station preparing an MP-UE antenna panel configuration compatible with the received antenna panel report. In such examples, the base station transmits, to the MP-UE, the determined antenna panel configuration.

Example 16 includes a computer-readable medium storing computer executable code, the code when executed by a processor cause the processor to execute the method of any one or more of claims 1-15.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A method of wireless communication performed by a multi-panel (MP) user equipment (UE) (MP-UE) comprising a plurality of physical antennas configurable as one of a plurality of antenna panels, comprising:
   identifying at least one capability of each of the plurality of antenna panels of the MP-UE, the at least one capability being separate from a status of the plurality of antenna panels of the MP-UE, and the at least one capability representing one or more of timing advance information, power control information, a resource set identifier, availability of activation or selection on physical open or folded configurations, or whether the corresponding antenna panel of the plurality of antenna panels is compatible with one or more other specific antenna panels of the plurality of antenna panels; and reporting, to a base station, the identified at least one capability of each of the plurality of antenna panels in accordance with an antenna panel reporting configuration for the MP-UE.

2. The method of claim 1, further comprising:
receiving, from the base station and prior to the reporting, the antenna panel reporting configuration, wherein the reporting comprises reporting in accordance with the received antenna panel reporting configuration.

3. The method of claim 2, wherein receiving the antenna panel reporting configuration comprises receiving the antenna panel reporting configuration as downlink control information (DCI).

4. The method of claim 1, wherein the reporting comprises reporting via at least one of radio resource control (RRC) protocol or Medium Access Control (MAC) protocol in at least one of physical uplink control channel (PUCCH) or physical uplink shared channel (PUSCH).

5. The method of claim 1, further comprising:
identifying, prior to the reporting, a particular antenna panel reporting event of a plurality of antenna panel reporting events,
wherein reporting the identified at least one capability is in response to the event identification.

6. The method of claim 5, wherein the plurality of antenna panel reporting events comprise at least one of: a change in a quantity of antenna panels of the MP-UE; a change in an allowed duty cycle for at least one antenna panel of the MP-UE, an elapsed time period, a change in activation compatibility between antenna panels of the MP-UE; or a change in selection compatibility between antenna panels of the MP-UE.

7. The method of claim 1, wherein the reporting comprises:
transmitting a scheduling request for reporting the identified at least one capability of each of the plurality of antenna panels in accordance with an antenna panel reporting configuration for the MP-UE;
receiving, from the base station, an uplink grant for the reporting; and
transmitting, to the base station, the identified at least one capability of each of the plurality of antenna panel in accordance with an antenna panel reporting configuration for the MP-UE.

8. The method of claim 1, further comprising:
receiving, from the base station and in response the reporting, a configuration for the antenna panels of the MP-UE; and
configuring one or more MP-UE antenna panels per the received configuration.

9. A multi-panel (MP) user equipment (UE) (MP-UE) for wireless communication, comprising:
a memory;
a plurality of physical antennas configurable as one of a plurality of antenna panels; and
a processing system comprising at least one processor coupled to the memory, wherein the processing system is configured to cause the MP-UE to:

identify at least one capability of each of the plurality of antenna panels of the MP-UE, the at least one capability being separate from a status of the plurality of antenna panels of the MP-UE, and the at least one capability representing one or more of timing advance information, power control information, a resource set identifier, availability of activation or selection on physical open or folded configurations, or whether the corresponding antenna panel of the plurality of antenna panels is compatible with one or more other specific antenna panels of the plurality of antenna panels; and report, to a base station, the identified at least one capability of each of the plurality of antenna panels in accordance with an antenna panel reporting configuration for the MP-UE.

10. The MP-UE of claim 9, wherein the processing system is configured to cause the MP-UE to:
receive, from the base station and prior to the identified at least one capability being reported, the antenna panel reporting configuration, wherein, to cause the MP-UE to report the identified at least one capability, the processing system is configured to cause the MP-UE to report the identified at least one capability in accordance with the received antenna panel reporting configuration.

11. The MP-UE of claim 9, wherein, to cause the MP-UE to report the identified at least one capability, the processing system is configured to cause the MP-UE to report the identified at least one capability via at least one of radio resource control (RRC) protocol or Medium Access Control (MAC) protocol in at least one of physical uplink control channel (PUCCH) or physical uplink shared channel (PUSCH).

12. The MP-UE of claim 9, wherein the processing system is configured to cause the MP-UE to:
identify a particular antenna panel reporting event of a plurality of antenna panel reporting events,
wherein, to cause the MP-UE to report the identified at least one capability, the processing system is configured to cause the MP-UE to report the identified at least one capability in response to the identification of the particular antenna panel reporting event.

13. The MP-UE of claim 12, wherein the plurality of antenna panel reporting events comprise at least one of: a change in a quantity of antenna panels of the MP-UE; a change in an allowed duty cycle for at least one antenna panel of the MP-UE, an elapsed time period, a change in activation compatibility between antenna panels of the MP-UE; or a change in selection compatibility between antenna panels of the MP-UE.

14. The MP-UE of claim 9, wherein, to cause the MP-UE to report the identified at least one capability, the processing system is configured to cause the MP-UE to:
transmit, to the base station, a scheduling request for reporting the identified at least one capability in accordance with an antenna panel reporting configuration for the MP-UE;
receive, from the base station, an uplink grant for reporting the identified at one capability; and
transmit, based on the uplink grant, the identified at least one capability.

15. The MP-UE of claim 9, wherein the processing system is configured to cause the MP-UE to:
receive, from the base station after the identified at least one capability is reported, a configuration for the antenna panels of the MP-UE; and configure one or more MP-UE antenna panels per the received configuration.

16. A non-transitory computer-readable medium having code stored thereon that, when executed by at least one processor of a multi-panel (MP) user equipment (UE) (MP-UE), causes the MP-UE to:
 identify at least one capability of each of a plurality of antenna panels of the MP-UE, the at least one capability being separate from a status of the plurality of antenna panels of the MP-UE, and the at least one capability representing one or more of timing advance information, power control information, a resource set identifier, availability of activation or selection on physical open or folded configurations, or whether the corresponding antenna panel of the plurality of antenna panels is compatible with one or more other specific antenna panels of the plurality of antenna panels; and
 report, to a base station, the identified at least one capability of each of the plurality of antenna panels in accordance with an antenna panel reporting configuration for the MP-UE.

17. The non-transitory computer-readable medium of claim 16, wherein the code stored thereon, when executed causes the MP-UE to:
 receive, from the base station and prior to the identified at least one capability being reported, the antenna panel reporting configuration, wherein the reporting comprises reporting in accordance with the received antenna panel reporting configuration.

18. The non-transitory computer-readable medium of claim 16, wherein the code that causes the MP-UE to report the identified at least one capability comprises code that causes the MP-UE to report the identified at least one capability via at least one of radio resource control (RRC) protocol or Medium Access Control (MAC) protocol in at least one of physical uplink control channel (PUCCH) or physical uplink shared channel (PUSCH).

19. The non-transitory computer-readable medium of claim 16, wherein the code stored thereon, when executed, causes the MP-UE to:
 identify a particular antenna panel reporting event of a plurality of antenna panel reporting events,
 wherein the code that causes the MP-UE to report the identified at least one capability comprises code that causes the MP-UE to report the identified at least one capability in response to identifying the particular antenna panel reporting event.

20. The non-transitory computer-readable medium of claim 19, wherein the plurality of antenna panel reporting events comprise at least one of: a change in a quantity of antenna panels of the MP-UE; a change in an allowed duty cycle for at least one antenna panel of the MP-UE, an elapsed time period, a change in activation compatibility between antenna panels of the MP-UE; or a change in selection compatibility between antenna panels of the MP-UE.

21. The non-transitory computer-readable medium of claim 16, wherein the code that causes the MP-UE to report the identified at least one capability comprises code that causes the MP-UE to:
 transmit, to the base station, a scheduling request for reporting the identified at least one capability of each of the plurality of antenna panels in accordance with an antenna panel reporting configuration for the MP-UE;
 receive, from the base station, an uplink grant for the reporting; and
 transmit, to the base station, the identified at least one capability of each of the plurality of antenna panels in accordance with the antenna panel reporting configuration for the MP-UE.

22. A method of wireless communication, comprising:
 receiving, by a base station from a multi-panel (MP) user equipment (UE) (MP-UE) an antenna panel report,
 wherein the antenna panel report comprises a capability of each of the antenna panels of the MP-UE in accordance with an antenna panel reporting configuration for the MP-UE, the capability being separate from a status of the plurality of antenna panels of the MP-UE, and the at least one capability representing one or more of timing advance information, power control information, a resource set identifier, availability of activation or selection on physical open or folded configurations, or whether the corresponding antenna panel of the plurality of antenna panels is compatible with one or more other specific antenna panels of the plurality of antenna panels.

23. The method of claim 22, further comprising:
 transmitting, by the base station and prior to the receiving, an antenna panel reporting configuration to the MP-UE, wherein the receiving comprises receiving the antenna panel report in accordance with the transmitted antenna panel reporting configuration.

24. The method of claim 22, further comprising:
 receiving, by the base station and prior to receiving the antenna panel report, an antenna panel report scheduling request (SR) from the MP-UE; and
 transmitting, by the base station to the MP-UE in response to receiving the SR and prior to receiving the antenna panel report, an uplink grant for the MP-UE to transmit the antenna panel report, wherein the received antenna panel report is received in the transmitted uplink grant.

25. The method of claim 24, wherein transmitting the uplink grant comprise transmitting the uplink grant in downlink control information (DCI).

26. The method of claim 22, wherein receiving the antenna panel report comprises receiving the antenna panel report under at least one of radio resource control (RRC) protocol or Medium Access Control (MAC) protocol in at least one of physical uplink control channel (PUCCH) or physical uplink shared channel (PUSCH).

27. The method of claim 22, further comprising:
 preparing, by the base station, an MP-UE antenna panel configuration compatible with the received antenna panel report; and
 transmitting, by the base station to the MP-UE, the prepared antenna panel configuration.

\* \* \* \* \*